United States Patent
Ahadian et al.

(10) Patent No.: US 9,964,464 B2
(45) Date of Patent: May 8, 2018

(54) OPTICAL TIME DOMAIN REFLECTOMETER WITH HIGH RESOLUTION AND HIGH SENSITIVITY

(71) Applicant: ULTRA COMMUNICATIONS, INC., Vista, CA (US)

(72) Inventors: Joseph F. Ahadian, San Marcos, CA (US); Kris Kusumoto, Lemon grove, CA (US); Charles B. Kuznia, Encinitas, CA (US)

(73) Assignee: Ultra Communications, Inc., Vista, CA (US)

(*) Notice: Subject to any disclaimer, the term of this patent is extended or adjusted under 35 U.S.C. 154(b) by 0 days. days.

(21) Appl. No.: 14/391,700

(22) PCT Filed: Apr. 10, 2013

(86) PCT No.: PCT/US2013/036047
§ 371 (c)(1),
(2) Date: Oct. 9, 2014

(87) PCT Pub. No.: WO2013/155235
PCT Pub. Date: Oct. 17, 2013

(65) Prior Publication Data
US 2015/0062563 A1 Mar. 5, 2015

Related U.S. Application Data

(60) Provisional application No. 61/623,046, filed on Apr. 11, 2012.

(51) Int. Cl.
*G01M 11/00* (2006.01)

(52) U.S. Cl.
CPC .... *G01M 11/3109* (2013.01); *G01M 11/3145* (2013.01)

(58) Field of Classification Search
CPC .................................................. G01M 11/3109
USPC ........................................................... 356/73.1
See application file for complete search history.

(56) References Cited

U.S. PATENT DOCUMENTS

| 4,769,534 | A | * | 9/1988 | Brand | ...................... | G01D 5/26 |
|---|---|---|---|---|---|---|
| | | | | | | 250/214 R |
| 5,023,445 | A | * | 6/1991 | Goll | ...................... | H04B 10/697 |
| | | | | | | 250/227.15 |
| 5,046,832 | A | * | 9/1991 | Bell | ......................... | G02F 1/33 |
| | | | | | | 356/73.1 |
| 5,062,704 | A | * | 11/1991 | Bateman | ............ | G01M 11/3145 |
| | | | | | | 250/227.15 |
| 5,104,219 | A | * | 4/1992 | Bell | ........................ | G02F 1/33 |
| | | | | | | 356/73.1 |

(Continued)

*Primary Examiner* — Tarifur Chowdhury
*Assistant Examiner* — Omar Nixon
(74) *Attorney, Agent, or Firm* — Jaquez Land Greenhaus LLP; John Land, Esq.

(57) ABSTRACT

An optical time domain reflectometer (OTDR) system with an integrated high speed optical modulator is capable of operating at a speed similar to the OTDR pulse width to improve the measurement resolution and reduce the time required to acquire a high dynamic range OTDR measurement over existing approaches. ASICs can be used to control the modulator and generation of pulses. The high-speed optical modulator enables high resolution single-photon OTDR measurement by blocking out all return light except from the region of fiber under examination.

20 Claims, 7 Drawing Sheets

(56) References Cited

U.S. PATENT DOCUMENTS

| | | | | |
|---|---|---|---|---|
| 5,465,143 | A * | 11/1995 | Chu | G01M 11/3145 356/73.1 |
| 5,724,126 | A * | 3/1998 | Nishi | G01M 11/319 356/73.1 |
| 6,376,830 | B1 * | 4/2002 | Froggatt | G01M 11/3145 250/226 |
| 6,594,004 | B1 * | 7/2003 | Makita | G01M 11/3145 356/73.1 |
| 7,400,387 | B2 * | 7/2008 | Lautenschlager | H04B 10/071 356/73.1 |
| 2004/0028084 | A1 * | 2/2004 | Cao | G06F 1/10 370/517 |
| 2006/0204165 | A1 * | 9/2006 | Froggatt | G01K 11/32 385/12 |
| 2008/0019693 | A1 * | 1/2008 | Sorin | H04Q 11/0067 398/71 |
| 2008/0316494 | A1 * | 12/2008 | Hartog | G01M 11/3145 356/446 |
| 2010/0002226 | A1 * | 1/2010 | Hartog | G01D 5/35364 356/73.1 |
| 2010/0314531 | A1 * | 12/2010 | Menge | G01T 7/005 250/214.1 |
| 2011/0220776 | A1 * | 9/2011 | Abedin | G01M 11/3145 250/205 |
| 2012/0200846 | A1 * | 8/2012 | Levin | H04B 10/071 356/73.1 |

\* cited by examiner

OPTICAL TIME DOMAIN REFLECTOMETER WITH HIGH RESOLUTION AND HIGH SENSITIVITY

CROSS-REFERENCE TO RELATED APPLICATION(S)

This application claims the benefit of International Patent Application no. PCT/US13/36047 filed Apr. 10, 2013 claiming priority to U.S. Provisional Patent Application No. 61/623,046 filed Apr. 11, 2012, titled "OPTICAL TIME DOMAIN REFLECTOMETER WITH HIGH RESOLUTION AND HIGH SENSITIVITY" the contents of which are hereby incorporated by reference in their entirety.

FEDERALLY-SPONSORED RESEARCH AND DEVELOPMENT

This invention was made with Government support under contract no. N68335-11-C-0470 awarded by the United States Navy. The government may have certain rights.

BACKGROUND

Field

The invention relates to the field of fiber optics. More particularly, it relates to the measurement of the fiber pathway in fiber optic systems.

Background

Fiber optics offers high data rate and electromagnetic interference immunity for data communications. While fiber optics was originally utilized for long distance links, fiber optics is now becoming prevalent in applications short distances links, for example within data centers, fiber-to-the-home (FIFTH), aircraft and ship-board. These systems would benefit from optical time domain reflectometer (OTDR) with high resolution to determine the precise location of fiber faults. OTDR operates by sending a short pulse of light into a fiber and measuring the round-trip time-of-flight from features in the fiber that reflect light. The measurement is often repeated many times and averaged to increase the accuracy of the measurement. The features may create relatively strong reflections from a precise point along the fiber path, such as the end of a polished fiber or contamination within a connector, which are referred to a 'reflective events' (RE). The REs may typically have reflection coefficient of −10 dB to −30 dB. Other features create little or no reflection 'non-reflective events' (NRE), such a Rayleigh back-scattering (RBS) or fiber bends that violate the minimum bend radius. The reflection coefficient of NREs typically is proportional to time duration of the pulse, or equivalently the distance spanned in the fiber by the pulse. The RBS may typically have a reflection coefficient of −70 to −100 dB/cm. Therefore, measurement of a RE and NRE with a resolution of 1 cm would require a receiver with a large dynamic range (60 dB to 90 dB).

There is a trade-off between the resolution of the OTDR (i.e., the ability to resolve the location of a fiber event) and the pulse length. The receiver amplifier can also limit the resolution, since a highly sensitive receiver (required to measure a NRE) can become saturated with the light returning from a RE. The saturation occurs because the optical receiver dynamic range is limited. Therefore, typical OTDR's are not capable of both high resolution and also high dynamic range.

Accordingly, various high sensitivity and high dynamic range systems and methods are described herein, that address the above and other limitations in the measurement community.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a method of optical time domain reflectometry (OTDR) is provided, comprising: transmitting a clocked optical pulse into a fiber under test; directing a reflected optical pulse from the fiber under test; receiving via a high speed modulator, the directed reflected optical pulse, wherein a receive window of the high speed modulator is enabled by a clocked signal; detecting via a single photon avalanche photo diode, an output of the high speed modulator; and measuring an output of the photo diode to determine a time difference from the transmitted clocked optical pulse to obtain an OTDR measurement.

In other aspects of some of the disclosed embodiments, the photo diode is a Geiger-mode avalanche photo diode; and/or at least one of the transmitting of the clocked optical pulse, receive window of the high speed modulator and measuring the output of the photo diode is controlled by a clocked integrated circuit chip; and/or the circuit chip is an application specific integrated chip (ASIC); and/or a first ASIC is used to transmit the clocked optical pulse and measure the output of the photo diode, and a second ASIC is used to enable the receive window of the high speed modulator; and/or a third ASIC is used to coordinate clocking of the first and second ASICs; and/or further comprises attenuating the reflected optical pulse prior to receiving via the high speed modulator; and/or the attenuating is via a variable optical attenuator; and/or further comprises providing a user control of the OTDR measurement via a user interface and controller.

In another aspect of the disclosed embodiments, an optical time domain reflectometry (OTDR) apparatus is provided, comprising: means for transmitting a clocked optical pulse into a fiber under test; means for directing optical pulse from the fiber under test; means for receiving the directed reflected optical pulse from the means for directing, wherein a receive window of the means for receiving is enabled by a clocked signal; means for detecting an output of the means for receiving; and means for measuring an output of the means for detecting to determine a time difference from the transmitted clocked optical pulse to obtain an OTDR measurement.

In other aspects of some of the disclosed embodiments, the apparatus further comprises means for attenuating the reflected optical pulse prior to the means for receiving.

In yet another aspect of the disclosed embodiments, an optical time domain reflectometry (OTDR) apparatus is provided, comprising: a clocked high speed signal driving an optical light source; a splitter/combiner coupled to the optical light source; a fiber under test coupled to the splitter/combiner; a high speed modulator with a clocked window coupled to the splitter/combiner, receiving a reflected light from the fiber under test; and a single photon photo diode coupled to an output of the high speed modulator.

In other aspects of some of the disclosed embodiments, the apparatus further comprises an attenuator coupled between the splitter/combiner and the high speed modulator; and/or the light source is at least one of a laser, a vertical cavity surface emitting laser, an edge emitting semiconductor device, and a laser coupled to a modulator; and/or the clocked high speed signal and clocked window is at approximately 5 GHz; and/or further comprises: a first ASIC to transmit the docked optical pulse and measure the output of the photo diode; and a second ASIC to enable the receive window of the high speed modulator; and/or further comprises a third ASIC to coordinate clocking of the first and second ASICs; and/or further comprises a user control module, controlling OTDR measurement parameters; and/or further comprises a user control module, controlling OTDR measurement parameters; and/or further comprises a plurality of light sources.

DETAILED DESCRIPTION

The contents of U.S. Pat. No. 7,593,098, by Brendel, titled "High Dynamic Range Photon-Counting OTDR" are incorporated by reference in its entirety.

An OTDR implements an optical receiver to detect returning light. The receiver amplifier of a highly sensitive receiver (required to measure a NRE) can become saturated with the light returning from a RE, wherein the saturation occurs because the optical receiver dynamic range is limited. The effective dynamic range of the receiver can be extended by adjusting the light amplitude of the transmitted pulse, adjusting the duration of the pulse, or using a variable optical attenuator in the path of the returning light. However, these approaches have limited effectiveness in achieving high sensitivity needed to measure NRE events with high resolution. Single-photon detection (SPD) is a method of achieving very high sensitivity, much higher than conventional photodetector-amplifier schemes. However, SPDs saturate after receiving one (1) photon.

In view of the deficiencies of typical OTDR's and the promise of the SPD method, system(s) and method(s) are presented for an OTDR that controls the optical light into the SPD to increase the dynamic range, in order to measure the low optical power from NREs and the relatively higher power from REs. In some embodiments, an optical time domain reflectometer (OTDR) system with an integrated optical modulator is provided, capable of operating at a speed similar to the OTDR pulse width. Various embodiments improve the measurement resolution and reduce the time required to acquire a high dynamic range OTDR measurement over existing approaches.

In some embodiments, a short-pulse OTDR is used with a high-speed optical modulator in the optical return path of the photodetector, wherein the pulses are generated and return measured with application specific integrated circuits (ASICs). It should be understood that while the term "ASIC" has been used to described application specific integrated circuits, other circuits, modules, hardware that can provide equivalent performance and functionally may be used, without departing from the spirit and scope of this disclosure.

The high-speed optical modulator enables high resolution single-photon OTDR measurement by blocking out all return light except from the region of fiber under examination. This approach achieves the same dynamic range and sensitivity as photon counting ODTRs and the same throughput as conventional OTDRs.

Figure 1:
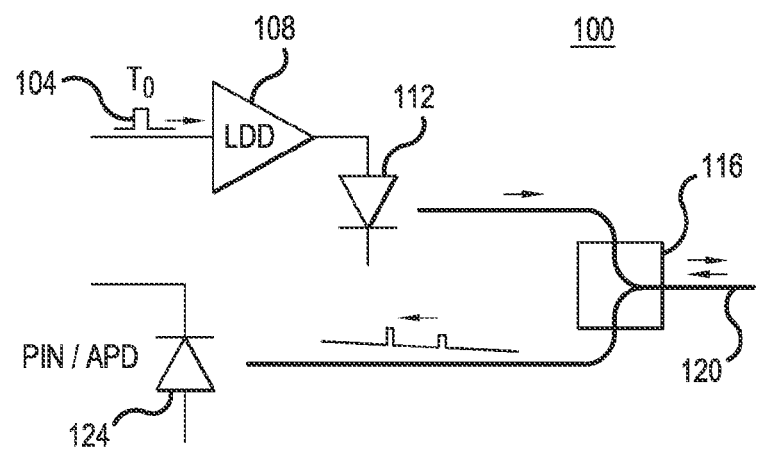
FIG. 1 is prior art of an overall block diagram of a conventional OTDR system.

FIG. 1 is a schematic illustration of a prior art OTDR 100. An electrical pulse 104 is converted by a driver 108 to a signal that drives a light source 112. The light source 112 can be a laser device, such as vertical cavity side emitting laser (VCSEL), edge emitting semiconductor laser or a laser coupled to a modulator (such as an electro absorbtion modulator EAM). Lasers that operate at high data rates can produce short optical pulses. For example, a 10 gigabit per second laser can create pulses of 100 picoseconds (ps) in duration. Light within a fiber travels at approximately 50 ps per centimeter (cm). In 100 ps, light can traverse and return from a 1 cm length of fiber. Therefore, a 100 ps pulse or shorter duration pulse can measure fiber with a resolution of 1 cm.

The pulse can be coupled into a fiber 120 with a splitter/combiner 116 element. The splitter/combiner 116 can couple light into fiber 120 on the outgoing path and couple light back into another fiber on the return path. The conventional OTDR 100 has a photodetector 124 that converts the received light power into a photocurrent. The photodetector 124 can be a PIN photodiode or an avalanche photodiode (APD). The conventional OTDR 100 cannot accommodate the full dynamic range between reflective events and RBS levels and therefore must sacrifice the resolution of spatial measurements. has a large dynamic range between reflective events and the RBS level.

Figure 2:
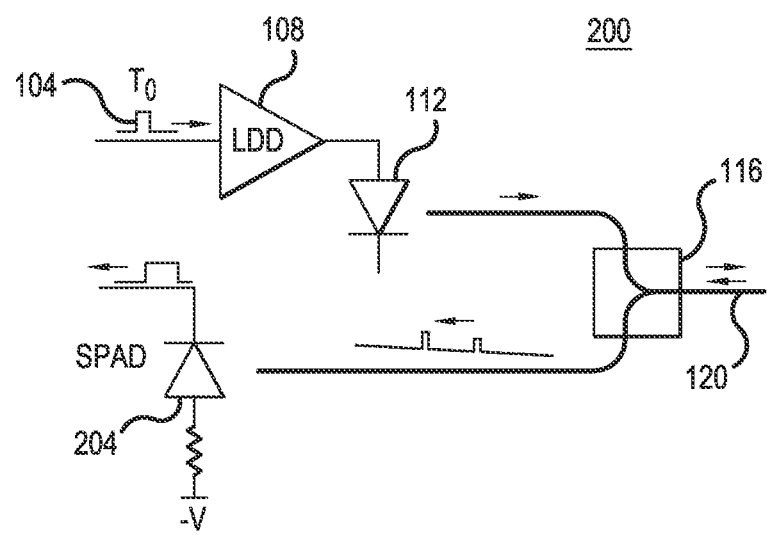
FIG. 2 is prior art of an overall block diagram of a photon counting OTDR system.

FIG. 2 is a schematic illustration of a prior art photon counting OTDR 200, utilizing a similar pulse 104, driver 108, light source 112, splitter/combiner 116 and fiber 120. However, a single photon avalanche photodetector (SPAD) 204 is utilized to detect the very light levels. The photon counting OTDR 200 can achieve high dynamic range and high resolution. The SPAD is also referred to as a Geiger-mode avalanche photo diode. The SPAD 204 is operated with a reverse voltage above the APD breakdown voltage. The SPAC 204 must be operated with a current limiter to avoid damage to the device. Characteristics of this design is that power must be reduced to allow single photon counting, and throughput is low when reflective events are present.

Figure 3:
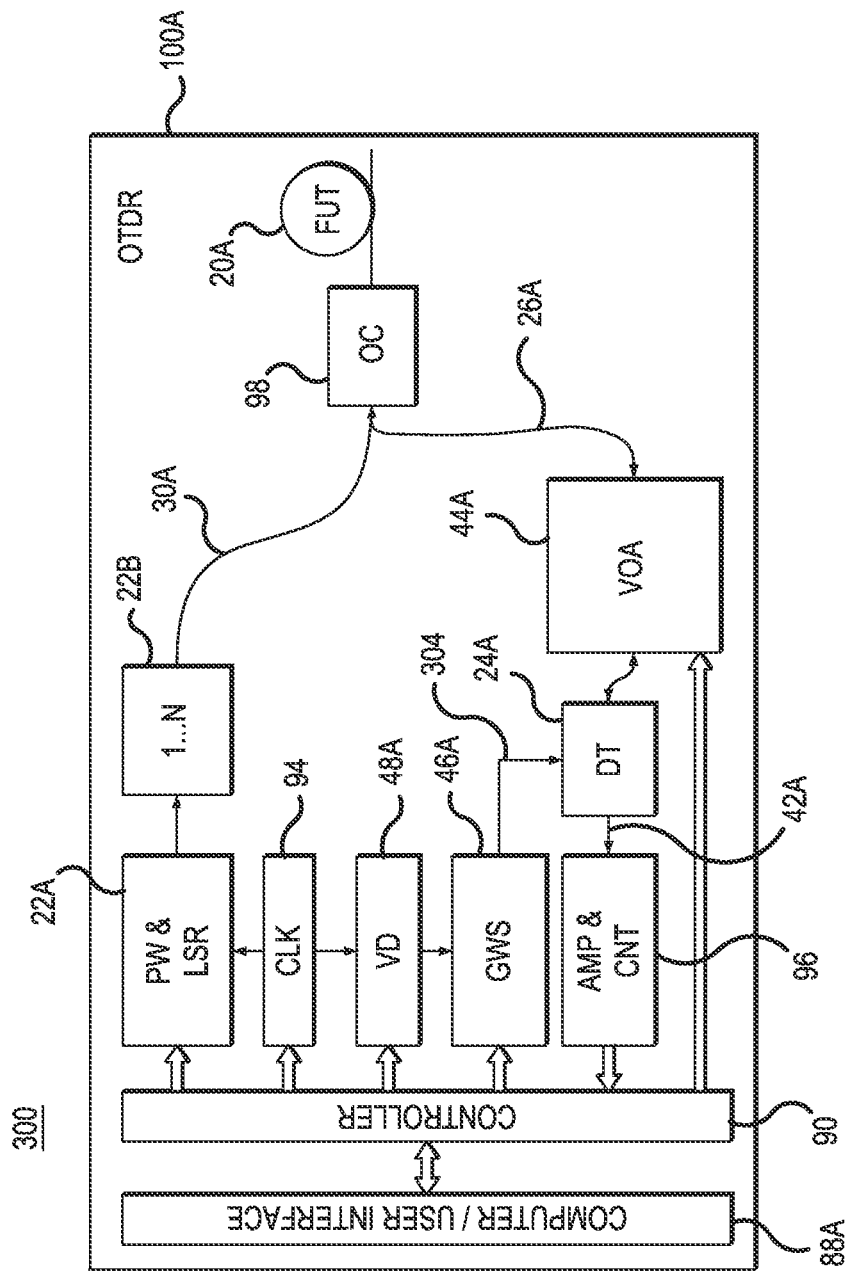
FIG. 3 is prior art of a block diagram of the OTDR function with a gating signal on the photodetector.
Figure 4:
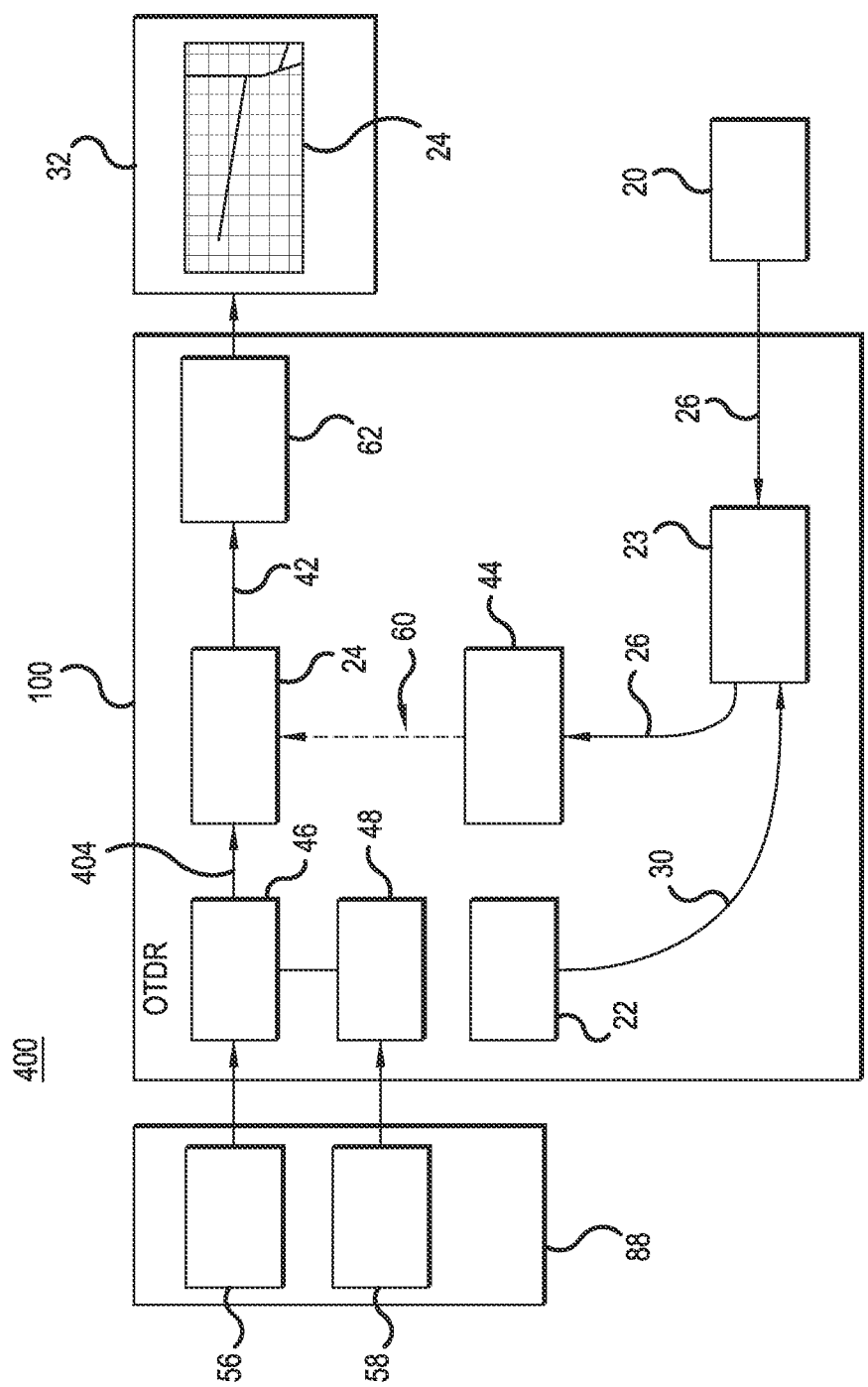
FIG. 4 is prior art of a block diagram of the OTDR function with a gating signal on the photodetector.

FIGS. 3-4 are block diagrams of different prior art photon counting OTDRs that gates the photodetector with a gating signal. This approach increases the throughput of the photon counting OTDR by detecting light only in a small window of time. It has been observed by the inventors that if the detector configured with a SPAR, the gating signal must be a high voltage signal and have a current limiting function.

FIG. 3 illustrates a prior art photon counting OTDR 300 with computer/user interface module 88a connected to controller module 90, which is connected to pulse width & laser selection module 22a, clock 94, variable delay module 48a, gate width selection module 46a, amplifier & counter module 96, and variable optical attenuator 44a. Pulse width & laser selection module 22a outputs to lasers 1 . . . N 22b. Output of gate width selection module 46a represent the gating signal 304 on the detector 24a and is connected to detector 24a which outputs a signal to amplifier & counter module 96. Lasers 1 . . . N 22b put out a short pulse of light 30a to optical coupler 96, which sends to the fiber under test (FUB) 20a. Rayleigh back-scattering (RBS) 26a received from the optical coupler 96 from the FUB 20a is sent the variable optical attenuator 44a, which is forwarded to the detector 24a.

FIG. 4 illustrates a photon counting OTDR 400 with a user interface 88 that controls the gate width parameter 56 and position parameter 58. Which in turn drive gate width circuit 46 and position circuit 48, respectively. Output 404 of gate width circuit 46 is input into photodetector 24, which is understood to be the gating signal on the photodetector 24. A short pulse of light 30 is pulsed from light pulse generator 22 to optical coupler 23 which enters the FUT 20. The reflected light RBS 26 is sent by the optical coupler 23 to variable optical attenuator 44 which is attenuated 60 to photodetector 24. The output 42 of photodetector 24 is sent to a signal regeneration block 62 wherein a display 32 or graph 34 of the detected signal is presented.

Figure 5:
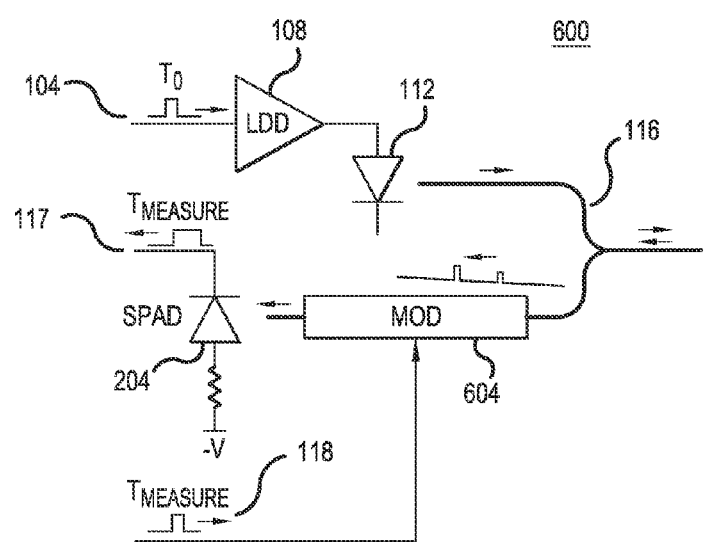
FIG. 5 is an example of a photon counting OTDR with a modulator in the optical return path.

FIG. 5 is a schematic illustration 600 of a modified FIG. 1-2 design with a gated photon detecting system with a high-speed modulator 604 placed in the path of back-reflected light, in front of the SPAD 204 which captures the reflected signal 117. A gating signal 118 can drive the high-speed modulator 604 to provide block out of return light except during the time of measurements. The high speed modulator 604 can be a mach-zehnder or electro-optic or electro-absorption modulator, or other types of modulators that achieve high speed modulation. This approach achieves the same dynamic range and sensitivity as a photon counting OTDR, but with the same throughput as a conventional OTDR.

Figure 6:
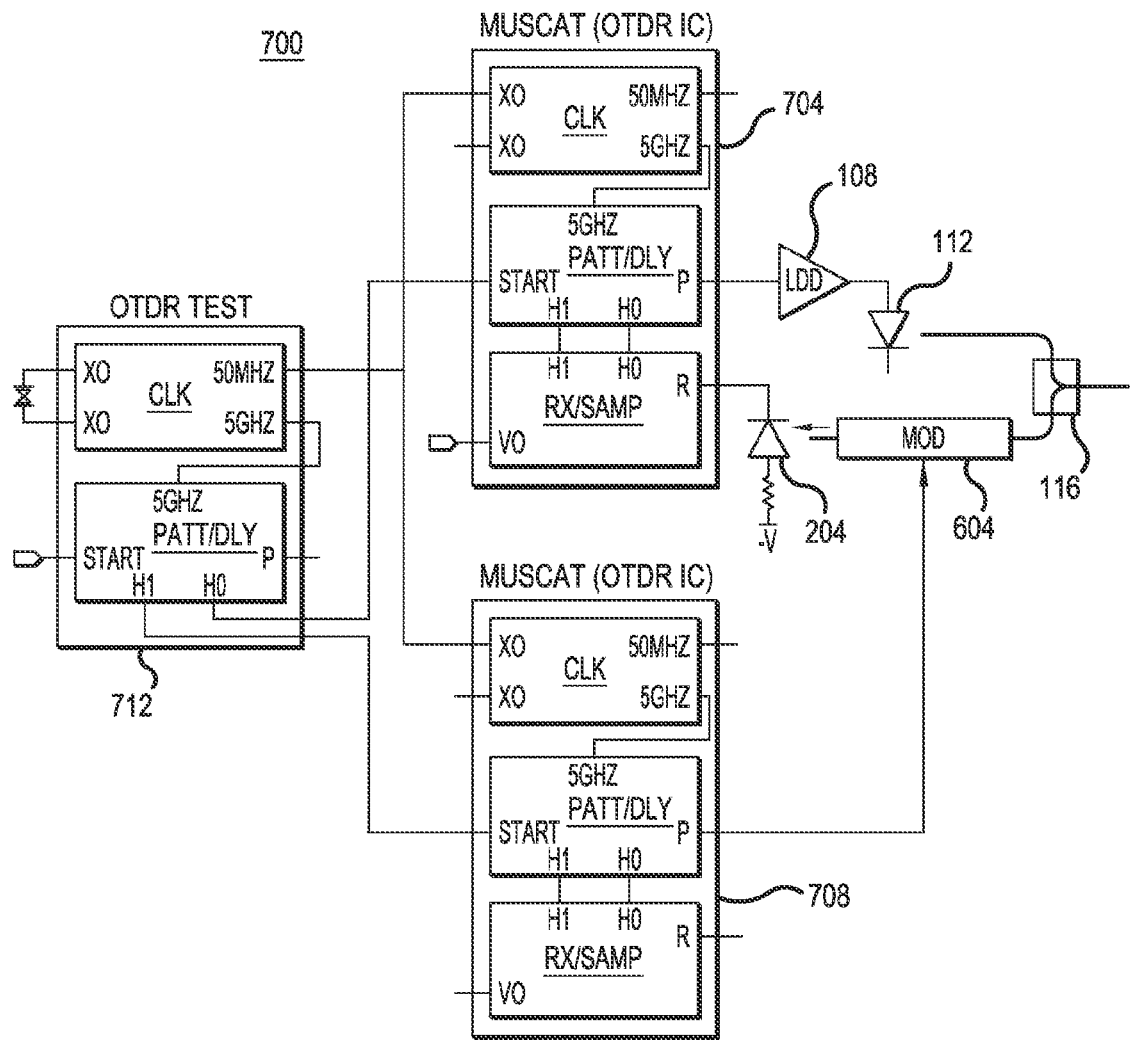
FIG. 6 is an example of a photon counting OTDR with a modulator in the optical return path and timing ASICs controlling the operation.

FIG. 6 shows a schematic diagram 700 of a gated photon detecting system with a high-speed modulator 604 placed in the path of back-reflected light, in front of the SPAD 204. The pulse and gating signals are generated by OTDR ASIC 704 and OTDR ASIC 708. These ASICs contain internal clock and pattern generation. OTDR ASIC 704 produces an electrical pulse into the driver 108, which generates a light pulse from the light source 112. Back reflected light from splitter/combiner 116 is sent into the high-speed modulator 604 which outputs to the single photon photodetector 204. The output of the single photon photodetector 204 is input into ASIC 704. ASIC 708 is in timing synchronization with ASIC 704. This can be achieved by sharing a common clock (CLK) signal. ASIC 708 generates a pulse (PATT/DLY) that gates the high speed modulator 604. A timing ASIC 712 can provide timing signals (CLK and PATT/DLY) to coordination the operation of ASIC 704 and ASIC 708. These timing signals can be the clock signal and signals that identify the timing of the pulse generation. The three ASICs could be integrated into a single ASIC or two ASICs or alternatively into more than three ASICs, if so desired. The ASICs can be controlled from a digital interface, which loads the parameters for the OTDR measurement (timing delays, pulse widths, pulse amplitude, clock speed, etc.). The parameters can have fast load function so the parameters are loaded in a single digital command. This allows for high speed repetition of identical OTDR measurements, averaging the result for increase accuracy, in a short amount of time. Additional modifications can include various computer/user interface and controller hardware as well as additional modules (such as shown in FIGS. 3-4) to provide measurement flexibility.

Figure 7:
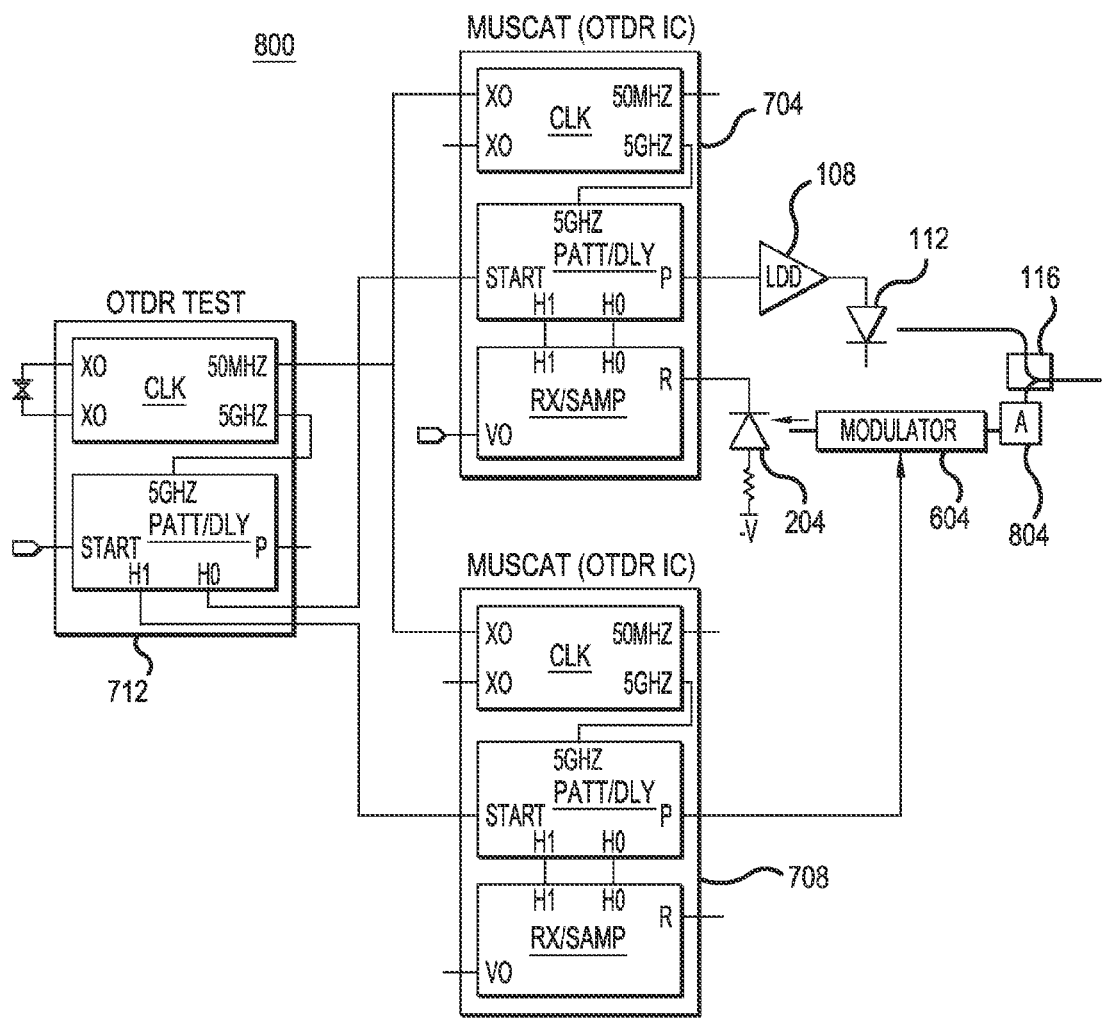
FIG. 7 is an example of a photon counting OTDR with a variable optical attenuator and modulator in the optical return path and timing ASICs controlling the operation.

It should be understood that the various clock speeds (e.g. approximately 50 Mhz, 5 GHz), signal line nomenclatures shown in FIGS. 6 and 7 are demonstrative of one or more possible configurations and are shown for illustrative purposes. Therefore, other clock speeds (lower or higher), signal line nomenclatures, etc. may be used, as well as configurations, depending on the selection choice of the ASIC. In some instances, the CLK and PATT/DLY signals may be combined into one signal.

FIG. 7 shows an example of a gated photon detecting system with a high-speed modulator 604 placed in the path of back-reflected light, in front of the SPAD 204. This embodiment is similar to the embodiment described in FIG. 6 with the principal difference of a variable optical attenuator 804 being placed in the optical path between the splitter/combiner 116 and the high speed modulator 604. The pulse and gating signals are generated by OTDR ASIC 704 and OTDR ASIC 708. These ASICs contain internal clock and pattern generation. OTDR ASIC 704 produces an electrical pulse into the driver 108, which generates a light pulse from the light source 112. Back reflected light from splitter/combiner 116 is coupled into variable optical attenuator 804 and into the high-speed modulator 604 and then into the single photon photodetector 204. The output of the single photon photodetector 204 is input into ASIC 704. The ASIC 2 708 is in timing synchronization with ASIC 704. This can be achieved by sharing a common clock signal ASIC 708 generates a pulse that gates the high speed modulator 604. Timing ASIC 712 can provide timing signals to coordination the operation of ASIC 704 and ASIC 708. These timing signals can be the clock signal and signals that identify the timing of the pulse generation. The ASICs could be integrated into a single ASIC or two ASICs or alternatively into more than three ASICs, if so desired. The ASICs can be controlled from a digital interface, which loads the parameters for the OTDR measurement (timing delays, pulse widths, pulse amplitude, clock speed, etc.). The parameters can have fast load function so the parameters are loaded in a single digital command. This allows for high speed repetition of identical OTDR measurements, averaging the result for increase accuracy, in a short amount of time. Additional modifications can include various computer/user interface and controller hardware as well as additional modules (such as shown in FIGS. 3-4) to provide measurement flexibility.

Accordingly, in view of the above embodiments, methods and systems have been disclosed that enable OTDR measurements that are of high dynamic range and high sensitivity.

It is understood that the specific order or hierarchy of steps in the processes disclosed is an example of applicable approaches. Based upon design preferences, the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor can read information from, and write information to, the storage medium.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method of optical time domain reflectometry (OTDR), comprising:
    transmitting a clocked optical pulse into a proximal end of a fiber under test via a splitter/combiner;
    inputting from the splitter/combiner, a reflected optical pulse from the proximal end of the fiber under test to a high speed optical modulator;
    receiving via the high speed optical modulator the directed reflected optical pulse, wherein a receive window of the high speed optical modulator is enabled by a clocked signal;
    detecting, via a single photon avalanche photo diode, an output of the high speed modulator that is directed to the photo diode; and
    measuring an output of the photo diode to determine a time difference from the transmitted clocked optical pulse to obtain an OTDR measurement.

2. The method of claim 1, wherein the photo diode is a Geiger-mode avalanche photo diode.

3. The method of claim 1, wherein one at least one of the transmitting of the clocked optical pulse, receive window of the high speed optical modulator and measuring the output of the photo diode is controlled by a clocked integrated circuit chip.

4. The method of claim 3, wherein the circuit chip is an application specific integrated chip (ASIC).

5. The method of claim 4, wherein a first ASIC is used to transmit the clocked optical pulse and measure the output of the photo diode, and a second ASIC is used to enable the receive window of the high speed optical modulator.

6. The method of claim 5, wherein a third ASIC is used to coordinate clocking of the first and second ASICs.

7. The method of claim 1, further comprising attenuating the reflected optical pulse prior to receiving via the high speed optical modulator.

8. The method of claim 7, wherein the attenuating is via a variable optical attenuator.

9. The method of claim 1, further comprising providing a user control of the OTDR measurement via a user interface and controller.

10. An optical time domain reflectometry (OTDR) apparatus, comprising:
    means for transmitting a clocked optical pulse into a proximal end of a fiber under test;
    means for directing coupled between the means for transmitting and the proximal end, wherein the means for directing is able to direct a reflected optical pulse from the proximal end of the fiber under test away from the means for transmitting;
    means for optically passing via a clocked window, coupled between the means for directing and a means for detecting an optical energy, wherein the directed reflected optical pulse from the means for directing is forwarded to the means for detecting through the means for optical passing, wherein a receive window of the means for passing is modulated by a clocked signal; and
    means for measuring an output of the means for detecting to determine a time difference from the transmitted clocked optical pulse to obtain an OTDR measurement.

11. The apparatus of claim 10, further comprising means for attenuating the reflected optical pulse prior to the means for optical passing.

12. An optical time domain reflectometry (OTDR) apparatus, comprising:
    a clocked high speed signal driving an optical light source;
    a splitter/combiner coupled to the optical light source;
    a fiber under test with an end proximal to the optical light source coupled to the splitter/combiner;
    a single photon photo diode; and
    a high speed optical modulator with a clocked window coupled to the splitter/combiner and to the diode, the clocked window selectively passing to the photo diode a reflected light from the splitter/combiner received from the proximal end of the fiber under test.

13. The apparatus of claim 12, further comprising an attenuator coupled between the splitter/combiner and the high speed optical modulator.

14. The apparatus of claim 12, wherein the light source is at least one of a laser, a vertical cavity surface emitting laser, an edge emitting semiconductor device, and a laser coupled to the modulator.

15. The apparatus of claim 12, wherein the clocked high speed signal is a clocked window at approximately 5 GHz.

16. The apparatus of claim 12, further comprising:
    a first ASIC to transmit the clocked optical pulse and measure the output of the photo diode; and
    a second ASIC to enable the receive window of the high speed optical modulator.

17. The apparatus of claim 16, further comprising a third ASIC to coordinate clocking of the first and second ASICs.

18. The apparatus of claim 12, further comprising a user control module, controlling OTDR measurement parameters.

19. The apparatus of claim 17, further comprising a user control module, controlling OTDR measurement parameters.

20. The apparatus of claim 12, further comprising a plurality of light sources.

* * * * *